No. 821,815. PATENTED MAY 29, 1906.
S. B. MUIRHEID.
COTTON CHOPPER.
APPLICATION FILED APR. 8, 1905.
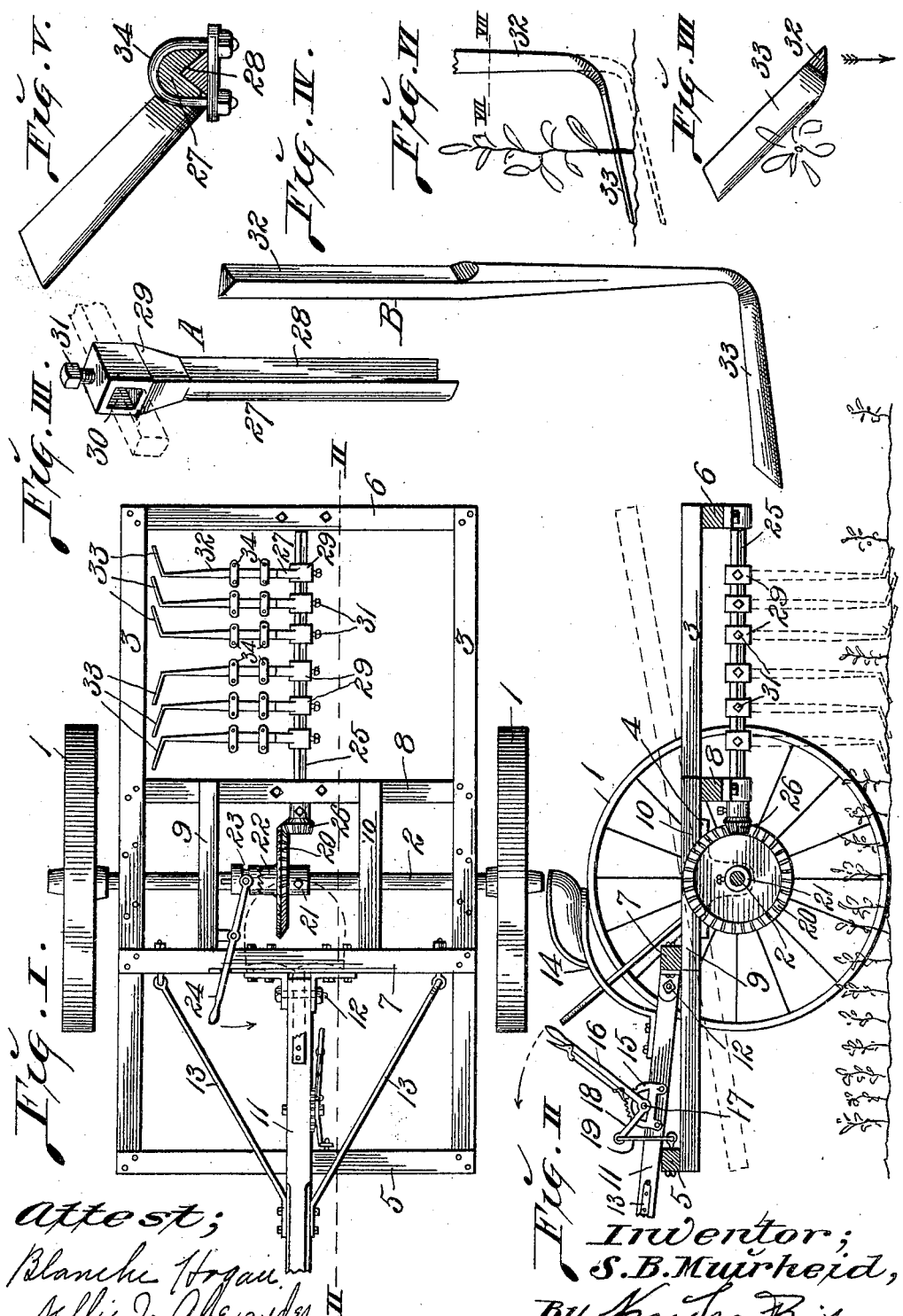
Attest;
Blanche Hogan
Nellie V. Alexander
Inventor;
S. B. Muirheid,
By Knight Bros
Attys.

UNITED STATES PATENT OFFICE.

SILAS B. MUIRHEID, OF ST. LOUIS, MISSOURI.

COTTON-CHOPPER.

No. 821,815.  Specification of Letters Patent.  Patented May 29, 1906.

Application filed April 8, 1905. Serial No. 254,436.

*To all whom it may concern:*

Be it known that I, SILAS B. MUIRHEID, a citizen of the United States, residing in the city of St. Louis, in the State of Missouri, have invented certain new and useful Improvements in Cotton-Choppers, of which the following is a full, clear, and exact description, reference being had to the accompanying drawings, forming part of this specification.

My invention relates to an implement for cutting or uprooting surplus stalks of young cotton-plants after the plants have sprouted, so that such number of plants will be left to grow as will properly mature in the requisite condition for efficient production of cotton. Briefly stated, the improvement consists in a series of adjustable cutters that are adapted to be used in connection with a draft appliance. The cutters are so constructed as to be susceptible of adjustment with respect to each other upon a support in order that they may be properly spaced apart. They are also so constructed that their blades are rendered adjustable with respect to the carrying-arms which form their supports, the latter adjustment being designed to permit of the cutters being lengthened or shortened in order that they may cut more or less deeply in their action upon the cotton-plants.

Figure I is a top or plan view of my cotton-chopper. Fig. II is a vertical longitudinal section taken on line II II, Fig. I. Fig. III is a perspective view of one of the cutter-blade-carrying arms. Fig. IV is a perspective view of one of the cutter-blades. Fig. V is a cross-section taken through the arm and shank of one of the cutters. Fig. VI is a front elevation of one of the cutter-blades. Fig. VII is a cross-section taken on line VII VII, Fig. VI.

1 designates the ground-wheels of my implement, in which is mounted the axle 2. The axle 2 supports a rectangular frame consisting of side bars 3, fitted intermediate of their ends to the axle by boxes 4, front and rear cross-bars 5 and 6, intermediate cross-bars 7 and 8, and tie-bars 9 and 10, connecting the intermediate cross-bars.

11 is a draft-tongue pivoted at 12 to the forward intermediate frame cross-bar 7 and adapted to rest normally upon the forward frame cross-bar 5. The tongue is also swingingly united to the intermediate cross-bar 7 by stay-links 13.

14 is a seat that may be mounted upon the draft-tongue, as shown, or upon the frame of the implement.

15 designates a segment-rack fixed to the draft-tongue, and 16 is a hand-lever pivoted to the segment-rack or to the tongue at 17. The hand-lever has an arm 18, that is united to the forward frame cross-bar 5 by a connecting-link 19. By manipulation of the hand-lever the frame of the implement may be oscillated from the position seen in dotted lines, Fig. II, and vice versa, in order to elevate or lower the rear end of the implement-frame.

20 designates a bevel gear-wheel loosely mounted upon the axle 2 and backed by a collar 21, rigidly held to the axle. The gear-wheel 20 is provided with a clutch-hub 22.

23 is a clutch-sleeve feathered to the axle 2 in opposition to the clutch-hub 22 and adapted to be shifted to and from said clutch-hub through the medium of a lever 24.

25 designates a non-circular shaft mounted in journal-boxes supported by the frame cross-bars 6 and 8 and extending longitudinally of the implement.

26 is a pinion fixed to the shaft 25 and arranged in mesh with the gear-wheel 20.

The parts thus far specifically described are known to be old, and no invention *per se* is herein claimed for them, the parts being designed as a means for carrying and actuating the cutters to which my invention relates and which I will now describe.

A designates the arms of the cutters, which consist of shanks 27, having non-circular sockets 28, preferably V-shaped, extending longitudinally thereof, and heads 29, having apertures 30 extending transversely therethrough. The apertured heads of the cutter-arms are adapted to be mounted upon the non-circular shaft 26 of the implement and to be held in adjusted positions on said shaft through the medium of set-screws 31, that pass through the cutter-arm heads and bear against the non-circular shaft.

B designates the cutter-knives, which consist of triangular shanks 32, that enter into the sockets 28 of the cutter-arm shanks 27, and blades 33, having cutting edges that extend at angles to the plane containing the axes of the shaft 25 and the shanks 27, preferably at about forty-five degrees, the cutting edges of the blades being disposed in inclinations with respect to the axes of the knife-shanks, as seen most clearly in Fig. IV, whereby they are caused to act with a shearing effect when the cutters are rotated in the use of my implement. The shanks of the cutter-blades are adjustably secured to the shanks of the cutter-arms by clips 34, which embrace said parts and bind them together. By the use of clips for binding the cutter blades and arms to each other I provide for the longitudinal adjustment of the blades with respect to the arms, so that the cutters may be lengthened or shortened to any desirable degree, whereby upon the rotation of the cutters with the shaft 25, by which they are carried, they will in their circular path of travel approach more or less nearly to the ground over which the implement is drawn or enter into the ground to either cut off the cotton-plants above the ground or uproot them. In mounting the cutters upon their carrying-shaft a portion of them are so disposed that their blades 33 point forwardly, while the remainder of the cutters are mounted with their blades projecting rearwardly, as seen in Figs. I and II.

In the practical use of my implement the implement is drawn through the cotton-field with the ground-wheels straddling a row of cotton-plants. During the travel of the machine rotation is continuously imparted to the shaft 25, due to the gearing thereof, to the implement-axle, and the cutters are moved in a circular path to approach or enter into the ground throughout the row of cotton-plants at intervals. Each time that the cutters move downwardly to the ground their blades act to cut off a portion of the cotton-plants which they encounter or to uproot such plants, and as they do so the plants intervening between the forwardly and rearwardly disposed cutter-blades are left standing at requisite distances from each other to grow and mature properly. It will be seen that the cutters may be shifted upon their carrying-shaft to make their cutting-blades operate to cut wider or narrower swaths between the plants to be left according to the desire of the user of the implement.

I claim as my invention—

In a cotton-chopper, the combination of a rotatable shaft, a series of cutters mounted on said shaft and having shanks and cutter-blades extending obliquely from the shanks, and a second series of cutters having shanks and cutter-blades extending in the opposite direction of the cutter-blades of the first-named series.

SILAS B. MUIRHEID.

In presence of—
BLANCHE HOGAN,
E. S. KNIGHT.